United States Patent [19]
Peat

[11] Patent Number: 5,069,623
[45] Date of Patent: Dec. 3, 1991

[54] EDUCATIONAL PLAY STRUCTURE

[76] Inventor: Elas D. Peat, 41 Marion Rd., Bethany, Conn. 06525

[21] Appl. No.: 503,235

[22] Filed: Apr. 2, 1990

[51] Int. Cl.⁵ .............................................. G09B 1/00
[52] U.S. Cl. .................................. 434/260; 434/365; 446/476
[58] Field of Search ........................ 434/365, 260–268, 434/433; 135/96, 97, 115, 119; 446/476, 478, 488, 108, 109, 110, 115, 112; D6/617, 618, 619, 624; 52/DIG. 12, DIG. 14, 5, 3, 4; 5/512

[56] References Cited

U.S. PATENT DOCUMENTS

| | | | |
|---|---|---|---|
| 2,153,081 | 4/1939 | Goodale | 135/96 |
| 2,420,706 | 5/1947 | Haven et al. | 52/3 X |
| 2,535,792 | 12/1950 | Goodale | 135/96 |
| 3,404,696 | 10/1968 | Filho | 135/115 X |
| 3,566,481 | 3/1971 | Causer | 434/260 |
| 3,715,816 | 2/1973 | White | 434/260 X |
| 4,098,536 | 7/1978 | Mills | 135/119 X |
| 4,192,333 | 3/1980 | Sato | 135/119 X |
| 4,696,652 | 9/1987 | Reeder et al. | 446/478 X |
| 4,765,006 | 8/1988 | Jackson et al. | 446/488 X |

FOREIGN PATENT DOCUMENTS 2373312 12/1976 France ................. 446/478

Primary Examiner—Richard J. Apley
Assistant Examiner—Rachel M. Healey
Attorney, Agent, or Firm—Chilton, Alix & Van Kirk

[57] ABSTRACT

An educational play structure adapted for mounting on a card table so as to form a play enclosure for young children. The structure comprises a flexible panel which has four side panels which are releasably connectable to form the enclosure. Access to the interior of the enclosure can be obtained only by unzipping a pair of flaps. The play structure is adapted for mounting various play objects and educational materials such as letters, numerals and shapes.

16 Claims, 2 Drawing Sheets

EDUCATIONAL PLAY STRUCTURE

BACKGROUND OF THE INVENTION

This invention relates generally to tents, playhouses and other structures which are enjoyed by young children. More particularly, the present invention relates to play structures having various educational features.

A number of educational devices have been introduced which combine children's play activities with educational objectives. For very young children, early education centers around self-sufficiency skills such as learning to zip and unzip outer clothing, tying shoelaces, fastening and unfastening various apparel fasteners, buttoning and unbuttoning various apparel, buckling and unbuckling belts and other basic dexterity skills. In addition, cognitive educational skills for young children involve familiarization with various common objects, shapes, letters and numerals.

Young children are very creative at their play activities. Over the years, young children have commonly crafted their own play structures by placing a sheet or cover over a card table or other similar structure to form an enclosure.

SUMMARY OF THE INVENTION

Briefly stated, the invention in a preferred form is an educational play structure which combines various early childhood self-dependency and cognitive educational tasks into a tent-like play structure. The play structure comprises a flexible panel manufactured of fabric having a central portion which is dimensioned to overlay a card table. Four side panels extend from the central portion and are dimensioned to generally extend the height and width of the card table so as to form an enclosure. One of the panels forms an entranceway. A zipper is operable to open and close the entranceway to permit entrance and egress into and from the enclosure. The corners of the enclosure are each connectable by removably connecting the adjacent side panels.

The corner connecting units preferably comprise fastener units selected form the group consisting of straps having releasable fabric loop/hook fastening type systems, tie cords, tabs having eyelets and laces, and tabs which are connectable by means of snap connectors. The entranceway may be formed by a pair of flaps which are connectable by a zipper. A pair of tabs connect the panel and extend over the flaps so that a button mounted to the upper portion of the flap is insertable through an opening to removably secure the flaps in a generally planar orientation with the rest of the panel. The fastener units are positioned along edge portions of the side panels to form a lower gap which permits a young child egress through the corners of the enclosure.

In one embodiment, a simulated tire is mounted to one of the panels. One or more simulated patches are removably mountable to the tire. In addition, arrays of attachments having the shape of numerals, geometric shapes and symbols may be mounted to the side panels. A simulated clock having a pair of manually positionable hands is also mounted to one of the side panels. Two buckles are mounted to one of the side panels. One of the side panels also has a window and a pair of shutters. A pocket, including a fastener for manually opening and closing the pocket, may also be mounted to one of the panels.

Flowers which include zippers along the stems are mounted to one of the side panels. Various simulated objects such as a hammer, wrench, screwdriver, oil can, watering can and ruler may be removably mountable to the side panels.

An object of the invention is to provide a new and improved educational play structure which facilitates young children learning basic manual skills in a creative play environment.

Another object of the invention is to provide a new and improved educational play structure which encourages young children to learn basic skills associated with dressing and undressing themselves.

A further object of the invention is to provide a new and improved educational play structure which incorporates a multitude of educational and play activities into a very compact and interesting play structure.

A yet further object of the invention is to provide a new and improved play structure which is foldable to a compact mode and is easily mountable over a card table or similar frame to provide a child's play structure having a multitude of educational and play activities.

Other objects and advantages of the invention will become apparent from the drawings and the specification.

DETAILED DESCRIPTION OF THE PREFERRED EMBODIMENT

Figure 1:
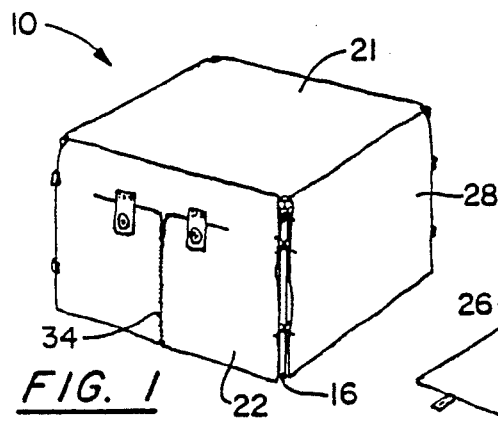
FIG. 1 is a perspective view of an educational play structure in accordance with the invention illustrated in an operative mode with selected details being omitted.

With references to the drawings wherein like numerals represent like parts throughout the figures, an educational play structure in accordance with the present invention is generally designated by the numeral 10. The educational play structure 10 is adapted to mount over a conventional card table 12 having a top 14 and legs 16 (FIGS. 7-10) so as to form a play enclosure for a young child as best illustrated in FIG. 1. The invention may be mounted over other types of structures capable of providing a suitable frame so as to form a play enclosure. The play structure may assume a wide range and variety of forms and configurations as will be detailed hereinafter. Accordingly, the drawings and description should be viewed as illustrative of numerous permutations and combinations of possible embodiments of the invention.

Figure 2:
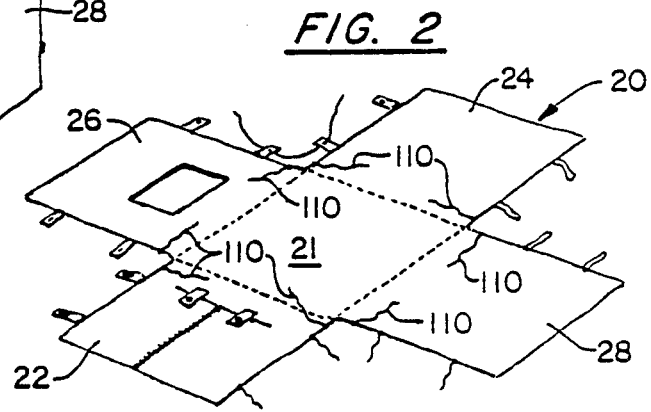
FIG. 2 is a perspective view of the play structure of FIG. 1 illustrated in a flattened configuration.

The principal component of the play structure is a flexible sheet 20 of fabric material as best illustrated in FIG. 2. The sheet of material may be formed of canvas, duck, trigger sailcloth, belique having a poly-cotton blend or other suitable material. Sheet 20 preferably has the general shape of a "plus" symbol comprising a generally square central portion 21 and four panels which extend from each of the sides of the square so as to form a front panel 22, rear panel 24 and side panels 26 and 28. The panels are dimensioned so that the central panel 21 which functions as the top of the structure is substantially commensurate (slightly greater) with the dimensions of the card table top 14, and each of the panels is dimensioned to extend substantially the distance between the sides of the card table and span a vertical height commensurate with that of the card table legs to provide the enclosure depicted in FIG. 1. It will be appreciated that the dimensions of sheet 20 are not critical. The specific designations as front, side and rear are merely for purposes of describing one embodiment of the invention.

Figure 3:
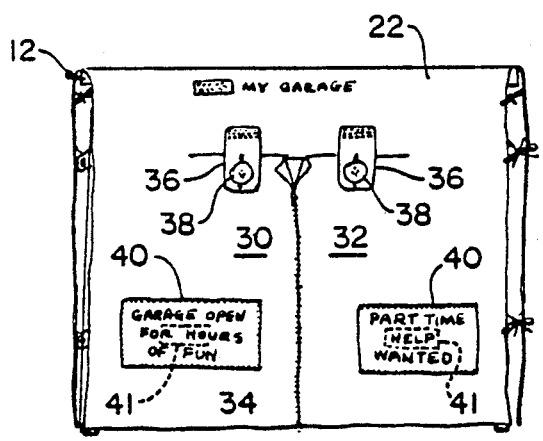
FIG. 3 is a front elevational view of the play structure of FIG. 1.

With reference to FIG. 3, front panel 22 comprises two cooperative flaps 30 and 32 which form a doorlike opening to the interior of the enclosure. An 18 inch zipper 34 connects adjacent vertical edges of the flaps 30 and 32 so as to provide an entranceway which is opened and closed by means of the zipper 34. Each of the flaps is further secured by means of an upper tab 36 connected to the panel and a cooperative 2 inch button 38 mounted to each flap so that the flaps may only be retracted after the flap is unbuttoned from the tab. The flaps 30 and 32 may be secured in a retracted open position by means of releasable fabric loop/hook type fasteners such as VELCRO TM straps (not illustrated).

Various insignias 40 such as designating the name of the owner or the name of the structure 40 may be affixed to the front panel by a releasable fabric loop/hook type fasteners 41 such as VELCRO TM strips (releasable fabric fasteners) or other fabric adhesive materials. In one form of the invention employed for describing the invention, the enclosure forms a simulated service station or garage, and thus one insignia 40 could, for example, have the designation "Paul's Garage" to further personalize the play structure or any child's name. Other insignias could have the designation "Help Wanted" or "Garage Open for Hours Of Fun". Other simulated structures such as a castle, fort, or house are also possible. Naturally, the designations are preferably consistent with the theme of the structure. Various names, signs and designations may also be embroidered or painted onto the panels.

Figure 6:
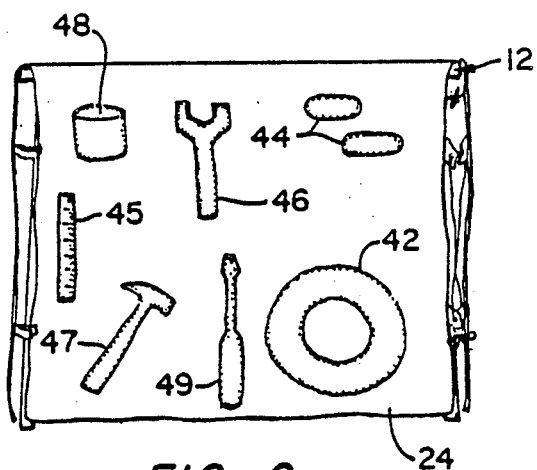
FIG. 6 is a rear elevational view of the play structure of FIG. 1.
Figure 7:
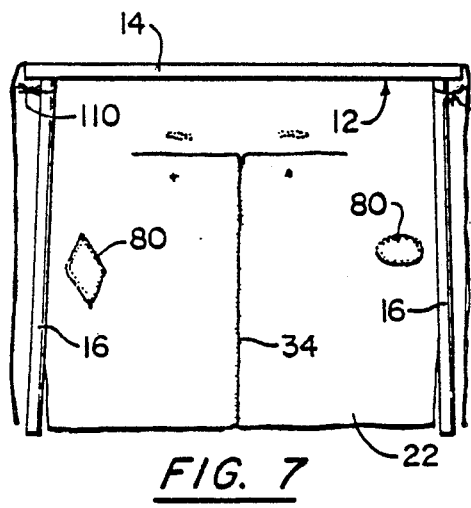
FIG. 7 is an interior elevational view of the front of the play structure of FIG. 1.
Figure 8:
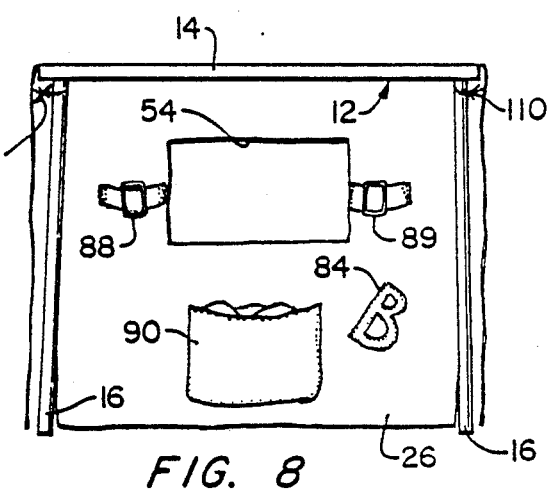
FIG. 8 is an interior elevational view of the left side of the play structure of FIG. 1.
Figure 9:
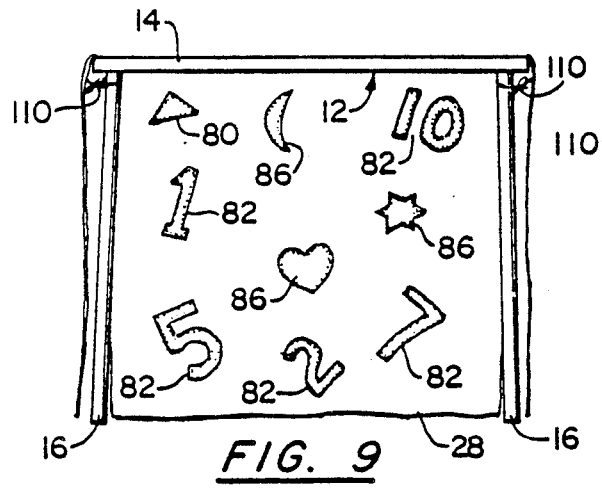
FIG. 9 is an interior elevational view of the right side of the play structure of FIG. 1.
Figure 10:
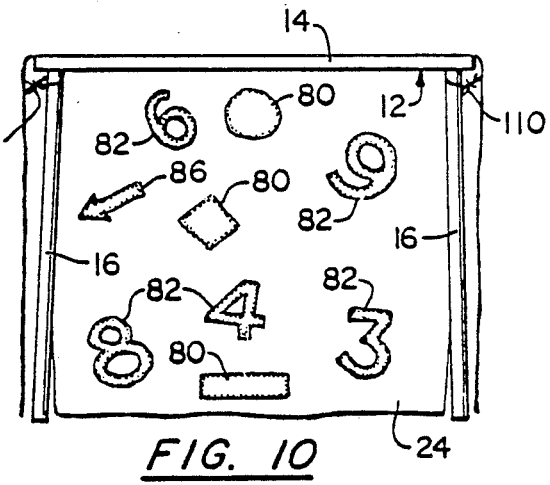
FIG. 10 is an interior elevational view of the rear of the play structure of FIG. 1.

With reference to FIG. 6, the rear panel 24 is affixed with a simulated automobile tire 42 which may be in the form of a stuffed or cushion-like structure which is removably fastened to the rear panel by releasable fabric fasteners or other suitable removable connectors. One or more patches 44 which also have a releasable fabric fastener or other conventional fasteners may be mounted to the rear panel and are affixible to the tire so as to patch the tire or simulate a tire repair. Other simulated garage accessories, such as ruler 45, wrench 46, hammer 47, oil can 48 and screwdriver 49, may also be attached by a releasable fabric fastener or other fastener to the rear panel so as to permit easy removal and mounting to the rear panel. Alternatively, the tire 42 may be painted or appliqued onto the panel. Some of the simulated accessories may also be formed by a pinked edge fabric construction enclosing a foam material.

Figure 4:
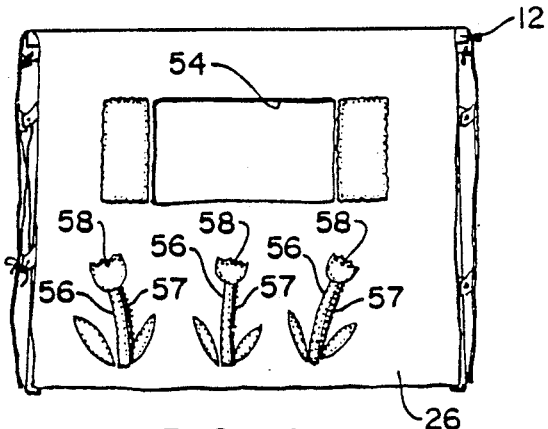
FIG. 4 is a side elevational view of the play structure of FIG. 1 viewed from the left thereof.

With reference to FIG. 4, side panel 26 includes a window 54. Shutters are painted or appliqued onto the side panel at the sides of the window. Various simulated flowers 56 may have removable petal portions 58 which are secured by releasable fabric fasteners. The leaves of flowers 56 may be cut from fabric and stitched onto the panel or may be painted on the panel or may take the form of painted fabric. Three 7 inch zippers 57 constitute the stems.

Figure 5:
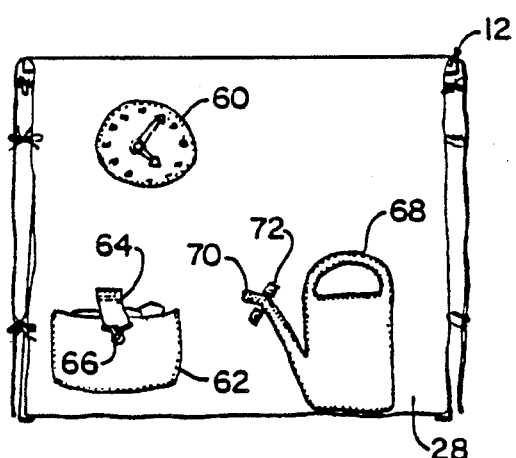
FIG. 5 is a side elevational view of the play structure of FIG. 1 viewed from the right thereof.

With reference to FIG. 5, side panel 28 exteriorly mounts a simulated clock 60 which may have a pair of hands for manual movement to indicate the time. Alternately, the clock face may be painted onto side panel 28. A pocket 62 is exteriorly mounted to panel 28 and is secured by means of a 6½ inch ribbon with an overall closure 64 having a overalls clip button 66 employed to hold various play things such as alphabetic letters. A simulated fuel pump 68 in the form of a stuffed or cushion-like structure, including a hose 69, is removably mounted to side panel 28 by releasable fabric fasteners or other suitable releasable connectors. A strap 72 having a releasable fabric fastener secures the hose 69 when not in use. Alternately, the gas pump may be painted or appliqued onto the side panel. The hose may be formed from a tube of fabric stuffed with polyfil or may be formed from a pinked edge painted fabric enclosing a foam material.

The interior surfaces of panels 22, 24, 26 and 28 may be affixed with various geometric shapes 80, numerals 82, letters 84, symbols 86, etc., which are cut from cloth and painted or configured as desired. The shapes and symbols may also include the name identifying the shape or symbol. The shapes, numerals and letters may be painted or appliqued onto the panels or alternately (not illustrated) removably mounted to the panels by mating releasable fabric fastener strips. Two mating strips are mounted to the panel. The interior of the side panel 26 includes a pair of straps with buckles 88 and 89 which are operable from different directions to facilitate learning both left to right and right to left buckling skills. The interior surface of panels 24 and 28 may be affixed with selected shapes 80, numerals 82, and symbols 86 at various locations as desired. A pocket 90 for holding the various objects, such as letters 84 and flowers, is mounted to the interior side of panel 26.

Each of the adjacent portions of the panels of the enclosure are affixed with vertically spaced pairs of manual by releasable connector units as depicted in FIGS. 11 through 14. Preferably the connector units are different in type for each of the corners so as to present a variety of dexterity objectives for the child to master. The releasable connector units are vertically spaced to provide a lower egress opening between the panels of the enclosure for safety considerations.

Figure 11:
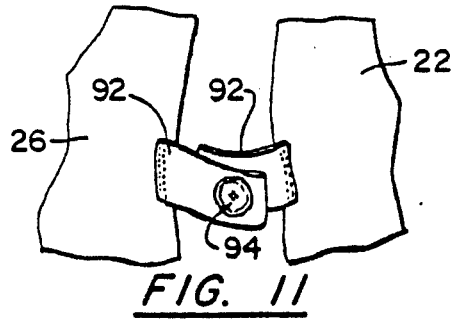
FIG. 11 is an enlarged fragmentary perspective view of a corner portion of the play structure of FIG. 1.
Figure 12:
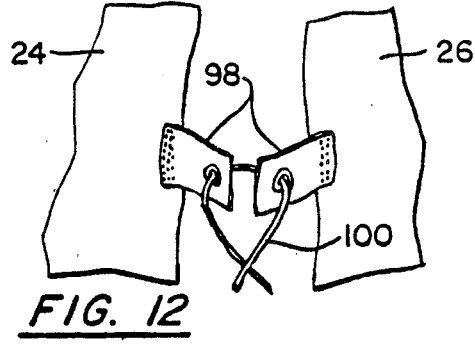
FIG. 12 is an enlarged fragmentary perspective view of a second corner portion of the play structure of FIG. 1.
Figure 13:
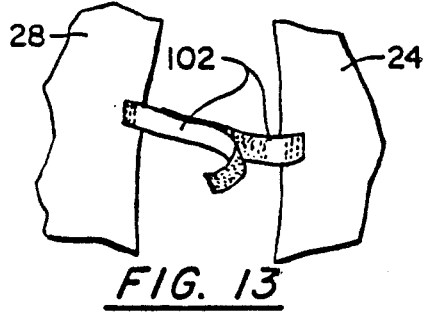
FIG. 13 is an enlarged fragmentary perspective view of a third corner portion of the play structure of FIG. 1.
Figure 14:
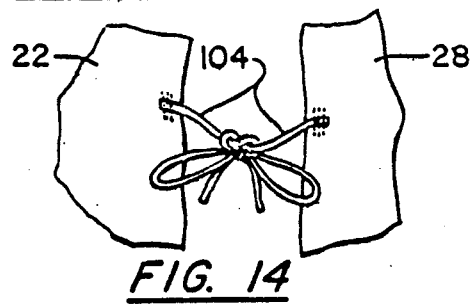
FIG. 14 is an enlarged fragmentary perspective view of a fourth corner portion of the play structure of FIG. 1.

With reference to FIG. 11, overlappable tabs 92 extend from opposed edge portions of panels 22 and 26 and connect by means of a snap connector 94 to connect the adjacent panels to each other and also around the corresponding medial leg 16 of the table. With reference to FIG. 12, overlappable tabs 98 have eyelets for receiving a lace 100 which may be tied for connecting the panels 24 and 26. With reference to FIG. 13, strips 102 of releasable fabric fasteners extend from adjacent edge portions of panels 28 and 24 and may be employed for connecting the panels. With reference to FIG. 14, a pair of ribbons 104 extend from adjacent edge portions of panels 22 and 28 and may be tied in a bow to connect the panels. The panels are preferably connected at two vertically spaced locations. Sufficient space is afforded at the lower portions of the panels to allow a child to easily exit the structure for safety. In addition, ribbons 110 which may be approximately 12½ inches long are positioned approximately 4½ inches from the top of the enclosure at each side edge of the panels for tying adjacent panels together. The ribbons extend around the inside portions of the table legs 16 and cooperate with the exterior leg connectors of FIGS. 11-14 to secure the enclosure to the table legs.

The various letters, numerals and shapes may be formed from a fabric material and include interface and batting or may be formed from fabric material having interface without batting. The letters may be formed with or without releasable fabric fasteners or may include various other fasteners. In one form of the invention, the various letters, numerals, shapes, etc. are decorated with VOGART TM liquid embroidery, tulip paint and/or DUNCAN SCRIBBLES TM paint. The letters, numerals and shapes may be formed in a wide variety of shapes, sizes and configurations.

It will be appreciated that the enclosure provides a mechanism whereby a young child is motivated to manipulate and to learn the basic dexterity skills such as zipping and unzipping, tying and untying, buckling and unbuckling, fastening and unfastening various fasteners, for example, in order to derive the maximum activity from the enclosure. In addition, the enclosure includes a wide variety of opportunities for the child to physically handle various letters, simulated tools and objects so as to become accustomed to their physical shape and their underlying concepts. The enclosure also facilitates creativity and playing by the child by providing, for example, a gas station motif so that the child can both play and educationally master various basic manual and cognitive skills.

The educational play structure 10 is easily transformable to a flattened mode such as illustrated in FIG. 2 wherein the enclosure may be folded for storage and transportation when not in use. Of course, it will be appreciated that various configurations for the enclosure may be provided. The purpose of the enclosure is to combine opportunities for mastering various manual skills in a play-type environment which is stimulating and allows for creative contribution on the part of the child. A multitude of activities and educational activities are provided by the structure. Naturally, the structure may be easily stored when not in use.

While a preferred embodiment of the foregoing invention is set forth for purposes of illustration, the foregoing description has been set forth for purposes of illustration and should not be deemed a limitation of the invention herein. Accordingly, various modifications, adaptations and alternatives may occur to one skilled in the art without departing from the spirit and the scope of the present invention.

What is claimed is:

1. An educational play structure adapted for mounted over a card table comprising:
   a flexible panel having a central portion dimensioned to overlie a card table and four side panels having opposed edge portions, said side panels extending from said central portion and dimensioned to generally extend the height and width of the card table so as to form an enclosure;
   one of said panels comprising means for forming an entranceway comprising a zipper which is operable to open and close said entrance to permit entrance and egress therethrough;
   an array of attachments having geometric shapes which are positioned on at least one side panel;
   corner connecting means for releaseably connecting adjacent panels to each other at discrete locations wherein said connected adjacent panels are not jointed along substantial adjacent edge portions and have substantial gaps therebetween.

2. The educational play structure of claim 1 wherein said corner connecting means further comprises fastener units selected from the group consisting of straps of releasable fabric loop/hook type fasteners, cords, tabs including eyelets having a lace therethrough, and tabs which are connectable by means of a snap connector.

3. The educational play structure of claim 1 wherein said fastener units are positioned along edge portions of said side panels and are fastenable to form a lower gap which permits a young child egress therethrough.

4. The educational play structure of claim 1 wherein said one panel further comprises a pair of flaps which are connectable by means of said zipper and a pair of tabs connecting said panel and extending over said flaps with a button being mounted to the upper portion of said flaps and insertable through an opening of said tabs so as to secure said flaps in a generally planar orientation with the rest of said one panel.

5. The educational play structure of claim 1 further comprising securement means comprising a plurality of ribbons mounted to the side panels for securing the panels to corresponding legs of the table.

6. The educational play structure of claim 1 further comprising an array of attachments having the shape of numerals which are positioned on at least one side panel.

7. The educational play structure of claim 1 further comprising a simulated clock having a pair of manually positionable hands mounted to a said panel.

8. The educational play structure of claim 1 further comprising at least one buckle mounted to a said panel.

9. The educational play structure of claim 1 further comprising a window defined in one of said panels.

10. The educational play structure of claim 1 further comprising a pocket and fastening means for manually opening and closing said pocket.

11. An educational play structure comprising:
    a flexible panel positionable in a flattened state comprising a generally planar central panel and four generally coplanar projecting side panels extending from said central panel, said panels being dimensioned and transformable from said flattened state so as to overlie a card table wherein said side panels form an enclosure;
    one of said side panels comprising means defining an entranceway including opening means for manually opening and closing said entranceway;

corner connecting means for releasably connecting each pair of adjacent panels to each other so as to form lower gaps between adjacent panels of the enclosure, said corner connecting means comprising a pair of spaced releasable connector units for each adjacent pair of side panels; and at least one simulated flower and a zipper simulating a stem to said at least one flower mounted to a said flexible panel.

12. The educational play structure of claim 11 wherein said corner connecting means further comprises fastener units selected from the group consisting of straps of releasable fabric fasteners, tie cords, tabs having eyelets receiving a lace therethrough, and tabs which are connectable by means of a snap connector.

13. The educational play structure of claim 12 wherein said one panel further comprises a pair of flaps which are connectable by means of said zipper and a pair of tabs connecting said panel and extending over said flaps with a button being mounted to the upper portion of said flaps and insertable through an opening of said tabs so as to removably secure said flaps in a generally planar orientation with the rest of said one panel.

14. The educational play structure of claim 12 further comprising securement means mounted to said side panels and cooperating with said corner connecting means for securing said panels to corresponding legs of the table.

15. The educational play structure of claim 14 wherein said securement means comprises a plurality of ribbons, a corresponding ribbon being mounted to each side panel side edge portion.

16. An educational play structure adapted for mounting over a card table comprising:

a flexible panel having a central portion dimensioned to overlie a card table and four side panels, said side panels extending from said central portion and dimensioned to generally extend the height and width of a card table so as to form an enclosure;

one of said panels comprising means for forming an entranceway comprising a zipper which is operable to open and close said entranceway to permit entrance and egress therethrough;

corner connecting means for releasably connecting adjacent panels to each other; and a simulated tire mounted to one of said panels and a simulated patch removably mountable to said tire.

* * * * *